Sept. 22, 1953  E. M. RAUH ET AL  2,652,825
MEDICAL DIAGNOSTIC INSTRUMENT
Filed Dec. 9, 1949
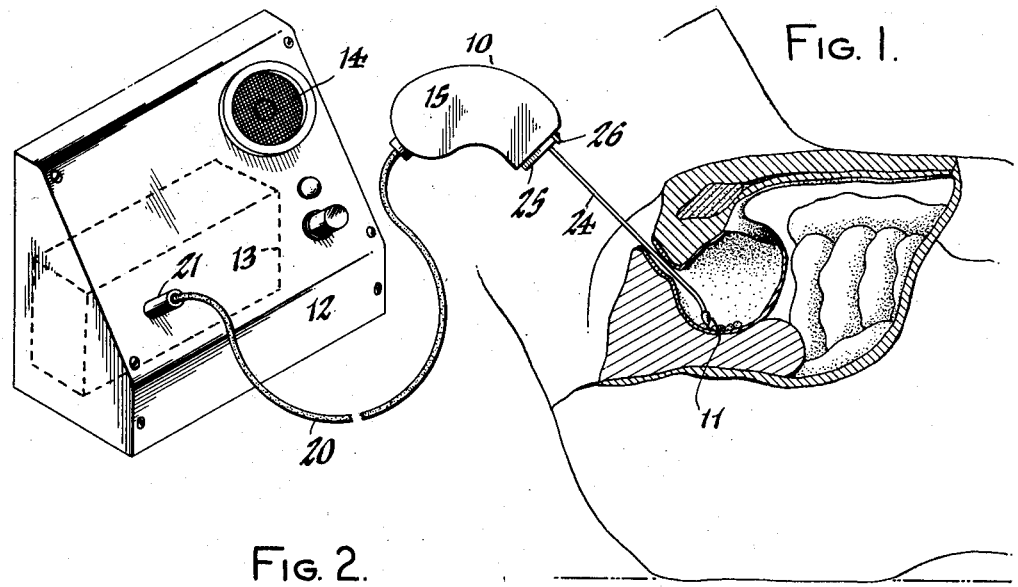
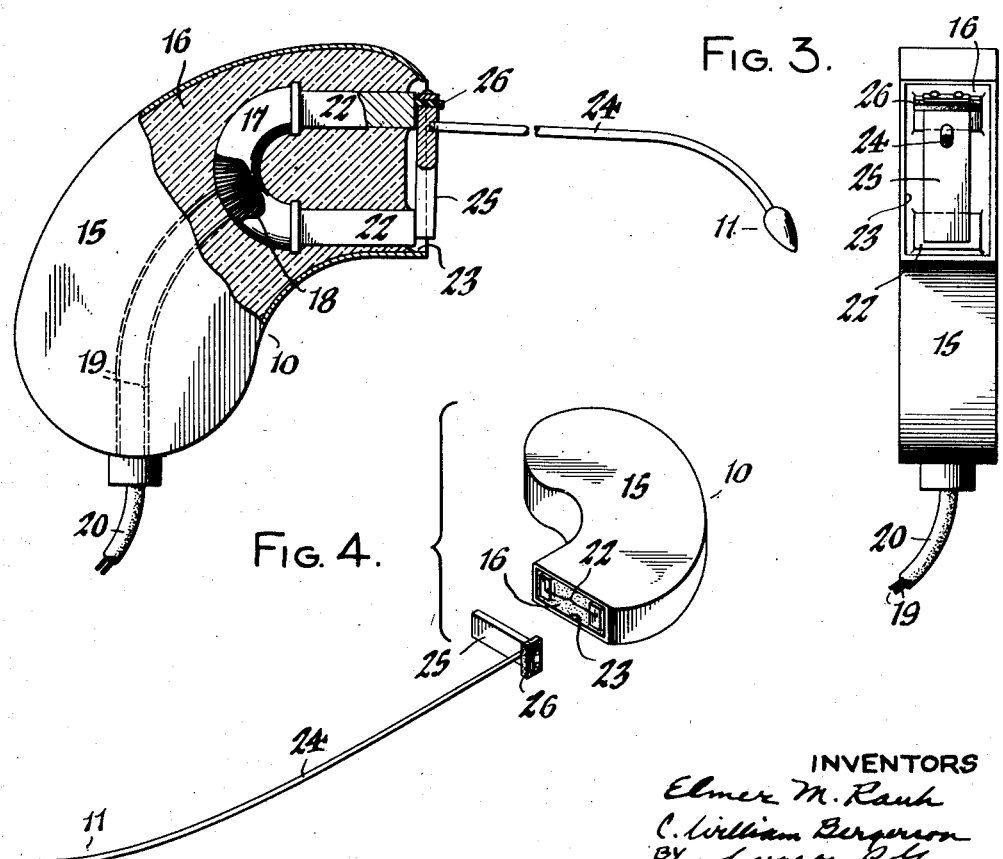
INVENTORS
Elmer M. Rauh
C. William Bergerson
BY
ATTORNEY Patented Sept. 22, 1953

2,652,825

UNITED STATES PATENT OFFICE 2,652,825

MEDICAL DIAGNOSTIC INSTRUMENT

Elmer M. Rauh and Charles William Bergerson, Buffalo, N. Y.

Application December 9, 1949, Serial No. 132,076

4 Claims. (Cl. 128—2)

This invention relates to certain new and useful improvements in a medical diagnostic device or instrument for aiding the surgeon in locating gall stones, kidney stones and other foreign bodies by contact.

One of its objects is to provide an electronic locator for this purpose which is so designed and constructed as to convert minute mechanical displacements into electrical impulses which are in turn amplified and made audible as sounds characterizing the material causing the electric impulses and deflections.

Another object of the invention is to provide a locator of this character which we call an "acousto-electrical" transducer, the same being designed for use with various types of probes or sensing elements which are adapted to be readily and instantly interchanged without mechanical fasteners or adjustments, and which are so constructed as to provide for the proper resilient mounting of the probe to allow for its mechanical displacement or deflection for conversion to electrical impulses.

A further object is to provide an electronic locator whose operative elements are completely isolated electrically from outside circuits so that no current passes to the patient, and whose elements can be easily cleaned and sterilized.

Other features of the invention reside in the construction and arrangement of parts hereinafter described and particularly pointed out in the appended claims.

In the accompanying drawings:

Figure 1 is a perspective view of our electronic locator instrument and amplifying and speaker unit showing the same connected for use by the surgeon. Figure 2 is an enlarged sectional elevation of the transducer elements of the locator with the probe in operative relation thereto. Figure 3 is a front end view of the same with the shank of the probe in section. Figure 4 is a perspective view of the locator elements in disconnected relation.

Similar characters of reference indicate corresponding parts throughout the several views.

This diagnostic instrument or apparatus has been primarily designed for use by doctors and surgeons for readily and effectually locating gall stones, kidney stones and other foreign bodies to be removed or otherwise treated and for serving as a check before closure at the end of an operation. The complete instrument consists generally of a sensitive electromagnetic transducer composed of a magnet-bearing member 10 constituting the manipulating handle of the instrument and an armature-bearing probe or sensing element 11 which may be any one of various types for investigation of the common duct and other areas for gall stones or for locating stones or obstructions in the ureter or for locating and removing foreign bodies such as glass or pieces of metal embedded in the tissues; a cabinet 12 of any appropriate design containing a high gain amplifier 13 of usual construction and a loud speaker 14 connected thereto and located on the front panel of such cabinet. The transducer functions to change mechanical vibrations into electrical impulses which feed through a conductor cord to the amplifier and in turn are transformed into sound and amplified, the surgeon identifying the sound from the speaker as one made by the probe coming in contact with a stone or other object, depending on the intensity of the sound.

The transducer member 10 preferably consists of a housing or hollow body 15 open at its front end and filled with a resilient plastic medium 16, the body being so shaped as to be conveniently grasped by the doctor in one hand for use. Embedded or suspended in well insulated fashion in the plastic medium is a permanent magnet 17 including a coil or winding 18 whose leads 19 are connected by a flexible cord to a suitable plug or fitting 21 in operative circuit relation to the amplifier 13. The pole pieces 22 of the magnet face outwardly and terminate substantially at the open end of the body 15 in exposed relation to the plastic medium 16, the exposed face of the latter and the surrounding marginal portion of the body defining a recess 23.

Each probe or sensing element includes an attaching shank 24 of wire or like flexible material which is provided at its inner end with means for magnetically and detachably connecting it to the transducer so that when any impact deflections, vibrations or mechanical displacements are imparted to the probe, as when contacted with a gall stone or other foreign body during a location investigation by the doctor, such displacements are transmitted to and converted by the transducer into electrical impulses which are fed to the amplifier 13 through the flexible cord 20. This probe connecting means preferably consists of a head 25 fixed adjacent one end thereof to the inner end of the probe to form an integral part thereof and constituting an armature which, when brought into operative relation to the pole pieces 22 of the magnet 17, is attracted thereto to retain the probe in position for use, as shown in Figures 1 and 2. The armature-forming head freely seats itself partially within the body-recess 23 and at one end is provided with a resilient pad or spacer 26 of rubber or like material which extends slightly and marginally beyond its edges and serves the dual purpose of maintaining optimum spacing between the magnet and the head and providing a cushion to allow for the vibration or movement of the head when it is excited by an external force, as by the probe contacting a gall stone or the like.

The probe shown in the drawings is of the common duct type but other types such as the ureteral probe, the tweezer probe or the needle probe are known and these several armature-equipped probes are instantly interchangeable for connection to the transducer by the surgeon during an operation.

While providing a very efficient instrument for effectually locating foreign bodies, it is simple, compact and inexpensive in construction and its parts can be readily cleaned and sterilized in either hot or cold solutions. Furthermore, its parts are completely isolated from all of the associated electrical circuits of the amplifier unit and there is no danger of electrical shocks being transmitted to the patient.

We claim as our invention:

1. A medical diagnostic instrument, comprising an electromagnetic transducer adapted for inclusion in the circuit of an amplifier and loud speaker unit including a hand-grasping body and a probe for detachable engagement therewith, said body and said probe having complemental magnet and armature elements thereon and one of the latter having a resilient spacer thereon for providing a cushion between such elements when in operative relation.

2. A device of the character described, comprising a hollow body open at one end and filled with a resilient medium, a magnet embedded in said body with its poles exposed through the open end thereof, a pick-up coil on said magnet, and a sensing element having an armature at one end adapted for detachable operative and supporting engagement with the poles of said magnet, and resilient means providing an air gap between one of said poles and the armature which gap is variable in response to variable force on the sensing element.

3. A device of the character described, comprising a hollow body open at one end and filled with a resilient medium, a magnet embedded in said body with its poles exposed through the open end thereof, a pick-up coil on said magnet, and a sensing element having an armature at one end adapted for detachable operative and supporting engagement with the poles of said magnet, said armature having a resilient spacing pad at one end thereof for providing a cushion between the magnet and the armature.

4. A sensing element, comprising a shank provided at one end with a transverse attaching head in the form of a substantially bar-shaped armature, and a resilient pad at one end and at right angles to the plane of said head and extending marginally beyond the edges thereof.

ELMER M. RAUH.
CHARLES WILLIAM BERGERSON.

References Cited in the file of this patent

UNITED STATES PATENTS

| Number | Name | Date |
|---|---|---|
| 999,225 | Hopewell | Aug. 1, 1911 |
| 1,586,952 | Knudsen et al. | June 1, 1926 |
| 2,321,355 | Berman | June 8, 1943 |
| 2,321,356 | Berman | June 8, 1943 |
| 2,436,538 | Wing | Feb. 24, 1948 |

FOREIGN PATENTS

| Number | Country | Date |
|---|---|---|
| 864,009 | France | Apr. 16, 1941 |